United States Patent Office 3,239,667
Patented Mar. 8, 1966

3,239,667
METHOD FOR DETERMINING THE NEUTRON FLUX ABOVE THE U-238 THRESHOLD ENERGY LEVEL
Edmond Roberts, Jr., Rockwood, and John W. Wachter, Oak Ridge, Tenn., assignors to the United States of America as represented by the United States Atomic Energy Commission
No Drawing. Filed Mar. 28, 1963, Ser. No. 268,838
3 Claims. (Cl. 250—83.1)

This invention relates to neutron dosimetry and more particularly to a threshold detector for determining the neutron flux above the U-238 threshold.

Nuclear fission reactors and critical assemblies produce neutron flux which is harmful biologically to personnel exposed thereto. Therefore, it is important that personnel working in the vicinity of such neutron sources be limited in their total neutron dose. The neutron flux escaping from a reactor is composed of a wide spectrum of energies called the physical neutron spectrum, which is classified into thermal, slow, intermediate and fast regions. In order to determine the total neutron dose, it has been the practice in the past to determine the amount of neutron flux in each of the various energy regions by means of suitable dosimeters and to calculate the total dose from the counts obtained from the various dosimeters.

For a more complete discussion of neutron dosimetry and detection means, reference is made to U.S.A.E.C. Report ORNL-2748 (Part A), issued November 16, 1959. In detecting fast neutron flux, fission foils of $Pu^{239}$, $Np^{237}$ and $U^{238}$ have been used in prior devices, such as described in the above report, and these foils are shielded by $B^{10}$ to remove the thermal neutrons. However, in large installations and production plants, the probability of a nuclear incident is about equal in any number of locations. The cost of the conventional threshold detector unit for fast neutron fluxes is about $1,300 each and is thus prohibitive to wholesale placement of such units throughout the installations and production plants. Thus, there exists a need for a simple, inexpensive detector that would not require the expensive $B^{10}$ shielding member.

It is well known that the isotope U-238 is an excellent threshold detector for neutrons above the 1.5 mev. energy level. However, even isotopically enriched U-238 contains traces of U-235 which is highly activated by thermal neutrons, and when counted, the U-235 emission cannot be separated from the U-238 emission without prior knowledge of the neutron spectra. It has been determined that for certain types of nuclear reactions almost 50 percent of the neutrons are consistently above the 1.5 mev. U-238 threshold energy level. Thus, the present invention can also be used as a dosimeter by merely doubling the reading obtained from such incidents and this would give the total tissue dose. When the present invention is used as a threshold detector or as a dosimeter, some way or method is required whereby the activation due to thermal neutrons can be subtracted out. The present invention provides one method by which this may be accomplished. The present invention also includes means for obtaining other dosimeter information as discussed below.

Accordingly, it is one object of this invention to provide a neutron threshold detector which is inexpensive, easily fabricated, and which can be used without expensive thermal neutron shields.

It is another object of this invention to provide a neutron threshold detector and a method for determining the neutron flux above the U-238 threshold, without use of expensive thermal neutron shields.

It is another object of this invention to provide a neutron threshold detector and method for determining the flux above the U-238 threshold, which can also be used as a dosimeter, and to provide for other dosimeter information.

These and other objects and advantages of this invention will become apparent upon a consideration of the following detailed specifications.

The above objects have been accomplished in the present invention by providing two U-238 foils of low, but differing, U-235 content so that the activation due to thermal neutrons can be subtracted out in a manner to be described below, thus permitting determination of the activation of the U-238 alone. Also, the other dosimeter information provided by the detector is accomplished in a manner to be discussed below.

Each of the U-238 foils is a ¾-inch diameter disk weighing about 1.5 to 4.0 grams, for example, and is enclosed in a copper holder. The two copper-enclosed foils are further enclosed in a common 0.036-inch cadmium shield member. This completed assembly is mounted in some convenient holder such as a cigarette case, for example. Also mounted in this latter holder are a sulfur pellet mounted in an aluminum cup member, a bare gold foil and a cadmium shielded gold foil, two dosimeter films enclosed in a plastic cover and partially shielded by a lead shield member, three silver metaphosphate glass rods in a plastic holder, and an indium foil member. The dosimeter information provided by the sulfur, gold foils, film, glass rods and indium foil is fully set forth in the above mentioned report, ORNL-2748 (Part A), and since these elements are conventional and do not constitute any novel part of the present invention, no further discussion thereof is considered necessary. Thus, the composite detector of this invention will provide the same information as the prior detector with the exception that the fast neutron flux above the 1 kev. energy level and the fast neutron flux above the 0.75 mev. energy level will not be detected.

The manner in which the U-238 foils are used in determining the neutron flux above the U-238 threshold will now be described. One of the U-238 foils (enriched foil) is composed of 0.71 percent U-235 and the remainder of U-238, for example. The other of the U-238 foils (depleted foil) is composed of 0.22 percent U-235 and the remainder of U-238, for example. The common cadmium shield enclosing these copper covered foils will provide some shielding from thermal neutrons.

When the above U-238 foils containing low, but differing, U-235 content are exposed to a source of neutrons, the neutron flux can be calculated as follows:

The total activity in a foil results from U-238 and U-235 fission as represented by $$A_{\text{TOTAL}} = (P_1)A_{235} + (1-P_1)A_{238}$$

and, after taking a count and obtaining an activity on two foils of different U-235 enrichment, one gets $$A_1 = P_1(A_{235}) + (1-P_1)A_{238}$$
$$A_2 = P_2(A_{235}) + (1-P_2)A_{238}$$

Solving these equations simultaneously, an expression for $A_{238}$ is obtained as follows:

$$A_{238} = \frac{P_2 A_1 - P_1 A_2}{P_2 - P_1}$$

where:

$A_1$ = activity (c./m./gm.) at time $t$, of the depleted foil;
$A_2$ = activity (c./m./gm.) at time $t$, of the enriched foil;
$A_{235}$ = activity of a pure U-235 foil;
$A_{238}$ = activity of a pure U-238 foil;

$P_1$=percent U-235 of the depleted foil; and
$P_2$=percent U-235 of the enriched foil.

The activity of each of the exposed foils can be measured by conventional measuring devices such as described in the above mentioned report, ORNL-2748 (Part A).

The U-238 activity can then easily be calculated by the use of a conventional calculating machine by using the values known and obtained for the above parameters in the expression for $A_{238}$.

From the above expression for $A_{238}$, it can be seen that the activity due to $A_{235}$ is subtracted out when the equations for the individual foils are solved simultaneously and the use of an expensive thermal neutron shield such as $B^{10}$ which is used in the conventional detector is not required for the detector of the present invention. The uranium foils are inexpensive, costing less than a dollar each, and thus lend themselves to widespread distribution such that in the event of a nuclear incident some of the present detectors would certainly be near enough to any one of several potential critical assemblies to be activated sufficiently for accurate counting by means such as described in the above mentioned report.

Due to the relatively large number of locations in which a nuclear incident could take place in certain large research plants, the probability of one of the conventional, widely spaced detector units being near enough to be activated is slight. The high cost of the conventional unit makes it economically necessary to limit the number of them used, and accordingly they cannot provide complete coverage of all possible locations where an incident might occur. On the other hand, it is economically feasible to locate the present low-cost U-238 threshold detectors densely enough that some units would receive the necessary flux for activation, in the event of a nuclear excursion.

In order to present the relative accuracy of the U-238 threshold detector of the present invention as compared to a boron-10 shielded detector, the following table shows the results obtained using normal and depleted foil pairs as a threshold detector and a depleted foil shielded by boron-10. Also shown in the table is the ratio of the counts obtained with the present invention and the conventional threshold detector. From the ratios shown it can be seen that the present invention is a satisfactory and sufficiently accurate substitute for the conventional threshold detector for determining the neutron flux above the U-238 threshold.

*Exposures I and II in ORNL graphite reactor*

| Exposure No. | Time (Min.) After Exposure | Net Counts/Min./Gram | | | | Ratio[1] |
|---|---|---|---|---|---|---|
| | | Outside Boron-10 | | Inside Boron-10 Depleted | Corrected to Pure U-238 | |
| | | Normal | Depleted | | | |
| I | 50 | 3,750 | 2,700 | 2,100 | 2,281 | 1.08 |
| | 100 | 1,400 | 960 | 770 | 784 | 1.02 |
| | 150 | 770 | 510 | 412 | 400 | .97 |
| | 200 | 507 | 350 | 280 | 287 | 1.03 |
| | 250 | 364 | 270 | 220 | 232 | 1.06 |
| II(A) | 50 | 7,700 | 5,600 | 4,699 | 4,762 | 1.01 |
| | 100 | 2,750 | 2,100 | 1,687 | 1,841 | 1.09 |
| | 150 | 1,450 | 1,060 | 905 | 904 | 1.00 |
| | 200 | 920 | 640 | 565 | 528 | .94 |
| | 250 | 630 | 430 | 382 | 350 | .92 |
| II(B) | 50 | 7,200 | 5,000 | 4,112 | 4,122 | 1.00 |
| | 100 | 2,700 | 1,820 | 1,487 | 1,469 | .99 |
| | 150 | 1,425 | 940 | 790 | 746 | .95 |
| | 200 | 920 | 590 | 495 | 458 | .93 |
| | 250 | 630 | 400 | 335 | 308 | .92 |
| II(C) | 50 | 5,800 | 3,750 | 3,150 | 2,930 | .92 |
| | 100 | 2,150 | 1,300 | 1,164 | 961 | .82 |
| | 150 | 1,150 | 700 | 602 | 520 | .86 |
| | 200 | 710 | 440 | 365 | 332 | .91 |
| | 250 | 475 | 300 | 235 | 230 | .98 |

[1] The ratio is the count on the depleted foil outside the boron sphere corrected to pure U-238 divided by the count on the depleted foil inside the sphere.

As mentioned above, the threshold detector of the present invention can be used to a degree as a neutron dosimeter. In certain types of nuclear reactions, for example those occurring in the Oak Ridge National Laboratory Tower Shielding Facility, in one example about 50 percent ±2 percent of the neutrons are consistently above the 1.5 mev. U-238 threshold energy level. Thus, merely doubling the reading obtained from such reactions or from incidents that might occur from certain other facilities will give a fairly accurate indication of the total tissue dose.

In certain other facilities, the maximum known variance in the neutron flux spectrum is indicated by the following: (1) the 1958 Oak Ridge Y-12 Plant incident produced a neutron flux having 65 percent of the spectrum above the 1.5 mev. U-238 threshold, and (2) the Yugoslavian incident produced a neutron flux having only 35 percent of the spectrum above the 1.5 mev. U-238 threshold. Although the use of the present invention as a dosimeter by using a proportional factor of two (2) could, in certain incidents, introduce an error of as much as ±30 percent in the estimated tissue dose, a perusal of the above report, ORNL-2748 (Part A), pages 1–16, indicates that a dosimeter accurate within 30 percent would have been desirable in earlier nuclear incidents. Also, with a knowledge of the materials involved in the reaction, an accurate estimate can be made as to which direction the calculated dose will be in error and about how much error is involved. Thus, from a determination of the neutron flux above the U-238 threshold and a knowledge of the facility involved in a critical incident, the total tissue dose can be easily determined by multiplying the calculated U-238 activity by a factor which is proportional to the ratio of the total dose to the U-238 activity. This factor can easily be calculated from a knowledge of the particular facility involved. Therefore, with the above mentioned known variance in the neutron flux spectrum, the proportional factor will be of selected value in the range from 1.54 to 2.86. Of course, as already stated, the present invention can be used as a fairly accurate neutron dosimeter in those nuclear incidents where almost 50 percent of the neutrons are consistently above the 1.5 mev. U-238 threshold energy level without any calculations further than merely doubling the reading obtained from such incidents.

This invention has been described by way of illustration rather than limitation and it should be apparent that this invention is equally applicable in fields other than those described.

What is claimed is:

1. A method for determining the neutron flux above the U-238 threshold energy level from a nuclear radiation source comprising the steps of exposing to said source a first, depleted uranium foil of U-238 with a U-235 content of $P_1$ percent, exposing to said source a second, enriched uranium foil of U-238 with a U-235 content of $P_2$ percent and different from the U-235 content of said first foil, producing a first output, $A_1$, corresponding to the radioactivity induced at time $t$ in said first foil, producing a second output, $A_2$, corresponding to the radioactivity induced at time $t$ in said second foil, and producing an accurate indication of the activity, $A_{238}$, of the pure U-238 in accordance with the relation:

$$A_{238} = \frac{P_2 A_1 - P_1 A_2}{P_2 - P_1}$$

2. The method set forth in claim 1, wherein the U-235, content, $P_1$, of said first foil is 0.22 percent, and the U-235 content, $P_2$, of said second foil is 0.71 percent.

3. The method set forth in claim 1, wherein each of said foils is of a selected weight in the range from 1.5 to 4 grams.

References Cited by the Examiner

UNITED STATES PATENTS 2,863,062 12/1958 Sturm _____ 250—83.1 X
2,969,307 1/1961 Fermi et al. _____ 250—83.1 X

OTHER REFERENCES

Neutron Flux and Spectrum Measurement with Radioactivants, by John Moteff from Nucleonics, vol. 20, No. 12, December 1962, pp. 56–60.

RALPH G. NILSON, *Primary Examiner.*

ARCHIE R. BORCHELT, *Examiner.*